US012753973B2

(12) United States Patent
Prabhu et al.

(10) Patent No.: US 12,753,973 B2
(45) Date of Patent: Oct. 6, 2026

(54) INDUCTION COILS AS NON-CONTACT TEMPERATURE BOOSTERS AND FLOW BOOSTERS FOR FERROUS AND NON-FERROUS MATERIALS IN A FURNACE

(71) Applicant: Inductotherm Corp., Rancocas, NJ (US)

(72) Inventors: Satyen N. Prabhu, Voorhees, NJ (US); Nier Wu, Mount Laurel, NJ (US)

(73) Assignee: INDUCTOTHERM CORP., Rancocas, NJ (US)

( * ) Notice: Subject to any disclaimer, the term of this patent is extended or adjusted under 35 U.S.C. 154(b) by 802 days.

(21) Appl. No.: 18/130,075

(22) Filed: Apr. 3, 2023

(65) Prior Publication Data

US 2024/0210112 A1 Jun. 27, 2024

Related U.S. Application Data

(60) Provisional application No. 63/434,598, filed on Dec. 22, 2022.

(51) Int. Cl.

| | |
|---|---|
| ***F27B 3/20*** | (2006.01) |
| ***F27D 11/06*** | (2006.01) |
| ***H05B 6/34*** | (2006.01) |
| ***H05B 6/36*** | (2006.01) |
| ***H05B 6/42*** | (2006.01) |
| ***H05B 6/44*** | (2006.01) |

(52) U.S. Cl.

CPC ................ *F27B 3/20* (2013.01); *F27D 11/06* (2013.01); *H05B 6/34* (2013.01); *H05B 6/365* (2013.01); *H05B 6/42* (2013.01); *H05B 6/44* (2013.01)

(58) Field of Classification Search

CPC ........ F27D 11/06; F27B 13/06; F27B 13/061; F27B 3/20; F27B 2014/002; F27B 2014/0837; H05B 6/365; H05B 6/367; H05B 6/18; H05B 6/34; H05B 6/42; H05B 6/44; H05B 2213/02; H05B 2206/02

See application file for complete search history.

(56) References Cited

U.S. PATENT DOCUMENTS 3,875,322 A * 4/1975 Sundberg ................. H05B 6/18 65/337
6,391,247 B1 * 5/2002 Heine ..................... C22B 9/003 266/237
6,693,950 B2 * 2/2004 Fishman .................. H05B 6/24 373/153
8,242,420 B2 * 8/2012 Fishman ............... C30B 11/003 117/223

(Continued)

FOREIGN PATENT DOCUMENTS

KR 102139886 B1 * 7/2020 .............. F27B 13/12

*Primary Examiner* — Ryan C Clark
(74) *Attorney, Agent, or Firm* — Robert J. Everling

(57) ABSTRACT

An apparatus comprising an induction furnace with a thermally and electrically conductive or non-conductive crucible containing an electrically conductive ferrous or non-ferrous material is provided with at least one bottom induction coil, one side induction coil and one top induction coil disposed exteriorly around the bottom, side and over the top surface of the material in the conductive or non-conductive crucible to provide a non-contact temperature boost or a flow rate boost to the material by selectively energizing a combination of the coils.

20 Claims, 7 Drawing Sheets

(56) References Cited

U.S. PATENT DOCUMENTS

| | | | | |
|---|---|---|---|---|
| 8,437,150 | B1 * | 5/2013 | Nadot | H02M 3/335<br>363/17 |
| 2009/0129429 | A1 * | 5/2009 | Fishman | H05B 6/44<br>373/146 |
| 2018/0177001 | A1 * | 6/2018 | Lazor | H05B 6/367 |

* cited by examiner

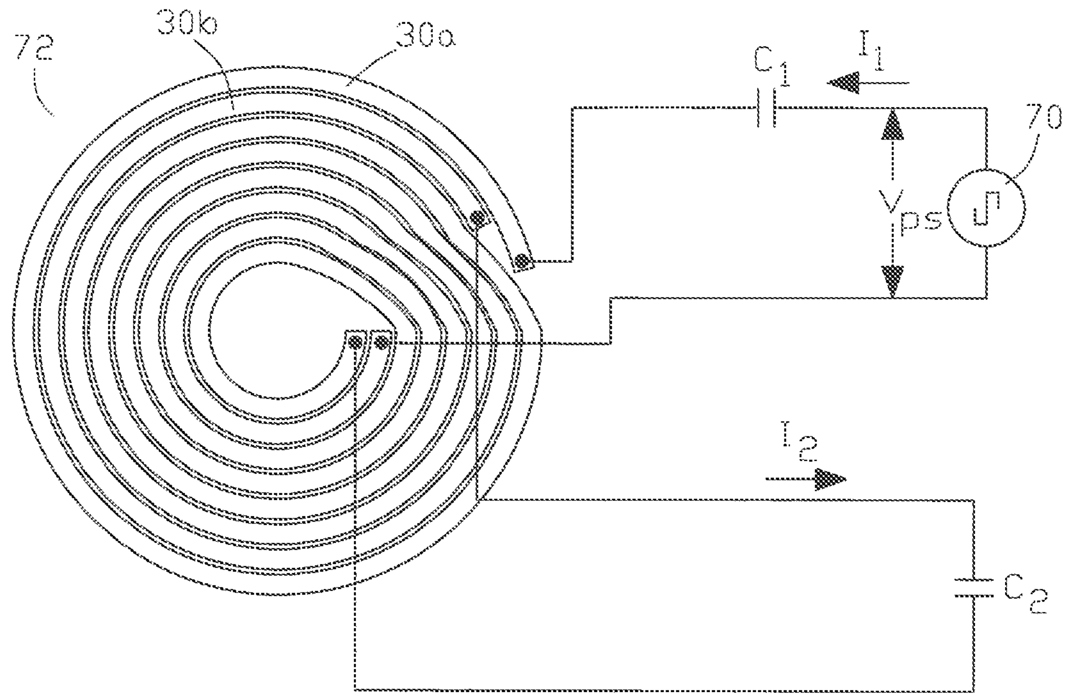
FIG. 5(a)
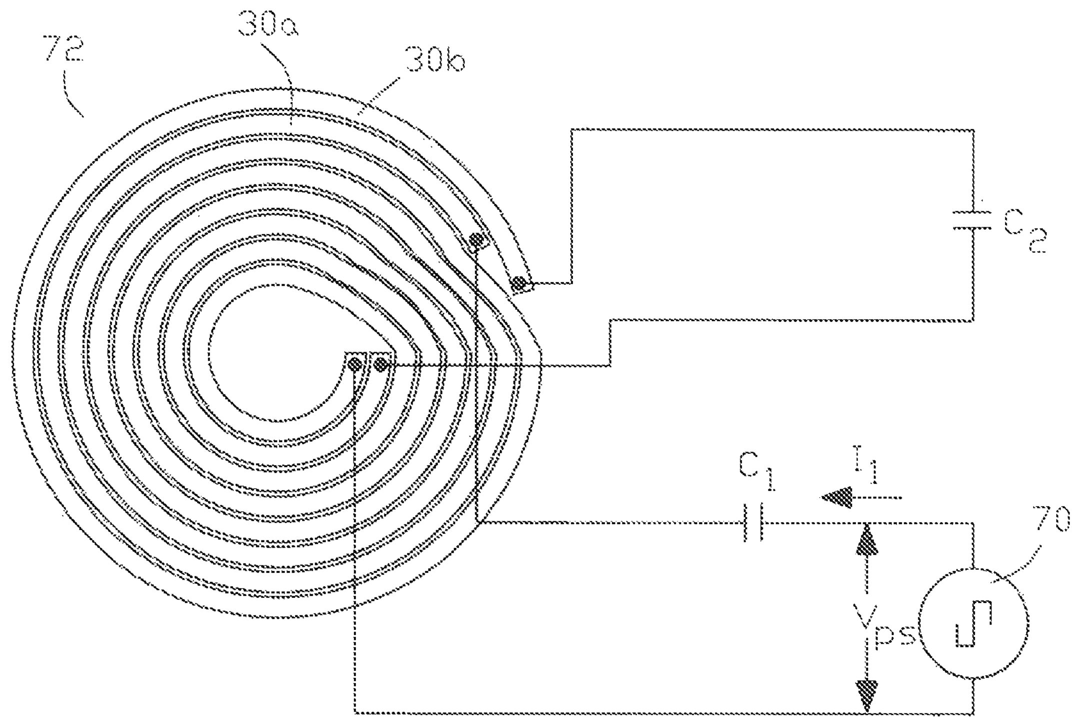
FIG. 5(b) $I_2$

INDUCTION COILS AS NON-CONTACT TEMPERATURE BOOSTERS AND FLOW BOOSTERS FOR FERROUS AND NON-FERROUS MATERIALS IN A FURNACE

CROSS-REFERENCE TO RELATED APPLICATIONS

This application claims the benefit of U.S. Provisional Application No. 63/434,598, filed Dec. 22, 2022.

FIELD OF THE INVENTION

This invention relates to raising the temperature or the flow rate of a ferrous or non-ferrous material in a furnace with power provided selectively among distributed energized induction coils as required for performing material processes such as melting the material in an induction furnace or holding the temperature of the material in the induction furnace at a set temperature for tapping molten material from the furnace for further processing such as pouring the molten material into molds. The furnace and method are particularly advantageous for materials having a low value of thermal conductivity such as aluminum and alloys thereof.

BACKGROUND OF THE INVENTION

Melting and heating electrically conductive ferrous and non-ferrous materials such as aluminum in a reverberatory furnace powered by fossil fuels is an inefficient process in terms of energy input, processing times and production of carbon emissions. Additionally, using submerged mechanical stirrers as flow boosters for the molten material in reverberatory furnaces are high maintenance and high failure items due to the submersed operation of the stirrers in molten material. The present invention addresses these problems by providing an apparatus for and method of melting, heating and/or stirring the material in an efficient manner by magnetic field induction heating produced by energized induction coils strategically disposed around the exterior of the apparatus that perform as temperature boosters or flow boosters of the material in apparatus comprising a thermally and electrically conductive or non-conductive crucible in an induction furnace.

The apparatus and method of the present invention are of particular value for temperature boosting and flow control of other ferrous or non-ferrous materials besides aluminum and its alloys with profile values of thermal conductivity equal to or lower than aluminum and its alloys.

SUMMARY OF THE INVENTION

In one aspect, the present invention is apparatus for and method of boosting the temperature and flow rate of a ferrous or non-ferrous electrically conductive material in a crucible of an induction furnace where the crucible is conductive or non-conductive.

A bottom induction coil is disposed outside of the bottom of a conductive or non-conductive crucible between a bottom coil support structure and a bottom magnetic flux concentrator so that a magnetic field generated external to the bottom induction coil is directed upwards to the material in the conductive or non-conductive crucible of the furnace to magnetically couple with the material and inductively boost the temperature or the flow rate of the material in the conductive or non-conductive crucible. In one embodiment of the invention the bottom induction coil may consist of one or more active and passive coil sections. An active coil section is impedance matched to the input of an alternating current (AC) power supply, and the passive coil section forms an inductive/capacitive resonant circuit. Magnetic coupling of the passive coil section with a magnetic field generated by current in the active coil generates a secondary magnetic field. The fields generated by the active coil section and the passive coil section are directed upwards to the material in the conductive or non-conductive crucible of the furnace.

A top induction coil is disposed over the top surface of the material in the conductive or non-conductive crucible.

In one embodiment of the invention the top induction coil is embedded in a fixed or removeable furnace lid at the top of the furnace. One or more top magnetic flux concentrators are positioned relative to the top induction coil so that a magnetic field generated external to the top induction coil, by a current flowing through it, is directed downwards towards the surface region of the material in the conductive or non-conductive crucible of the furnace to magnetically couple with the material below the surface of the material and inductively boost the temperature or the flow rate of the material. In one embodiment of the invention the top induction coil may consist of multiple active and passive coil sections. An active coil section is impedance matched to the input of an alternating current output from a power supply, and the passive coil section forms an inductive/capacitive resonant circuit. Magnetic coupling of the passive coil section with a magnetic field generated by current in the active coil generates a secondary magnetic field. The fields generated by the active coil section and the passive coil section are directed downwards towards the surface of the material in the conductive or non-conductive crucible of the furnace to inductively boost the temperature and flow rate of the material at and below the surface region in the conductive or non-conductive crucible.

In one embodiment of the invention a side induction coil is disposed at least partially around the exterior height of the side of the conductive or non-conductive crucible between a side coil support structure and a side magnetic flux concentrator so that a magnetic field generated external to the side induction coil, by a current flowing through it, is directed laterally inwards towards the material in the conductive or non-conductive crucible of the furnace to magnetically couple with the material and inductively boost the temperature or the flow rate of the material around the side of the conductive or non-conductive crucible. The side induction coil can be shaped as required for a particular application, including but not limited to being helical in shape around the side of the conductive or non-conductive crucible or other shapes including "pancake" shaped as shown in FIG. 4(*a*) to FIG. 5(*b*).

The above and other aspects of the invention will be apparent from the following description and the appended claims.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3(*b*) is a cross section elevation view of the bottom support structure of FIG. 3(*a*) as indicated by section line A-A in FIG. 3(*a*).

FIG. 4(*b*) is a diagram of another arrangement of a bottom, top or side induction coil used with an apparatus of the present invention wherein the bottom, top or side induction coil comprises an active coil section and a passive coil section.

FIG. 5(*a*) is a diagram of another arrangement of a bottom, top or side induction coil used with an apparatus of the present invention wherein the bottom, top or side induction coil comprises an active coil section and a passive coil section.

FIG. 5(*b*) is a diagram of another arrangement of a bottom, top or side induction coil used with an apparatus of the present invention wherein the bottom, top or side induction coil comprises an active coil section and a passive coil section.

FIG. (6*a*) and FIG. 6(*b*) are respectively alternative planar and perspective views of one non-limiting sample of a flat rectangular induction coil suitable for use as a bottom, top or side induction coil in the present invention.

FIG. 6(*c*) and FIG. 6(*d*) are respectively alternative planar and perspective views of one non-limiting sample of a pair of flat square induction coils suitable for use as a bottom, top or side induction coil in the present invention.

DETAILED DESCRIPTION OF THE INVENTION

Figure 1:
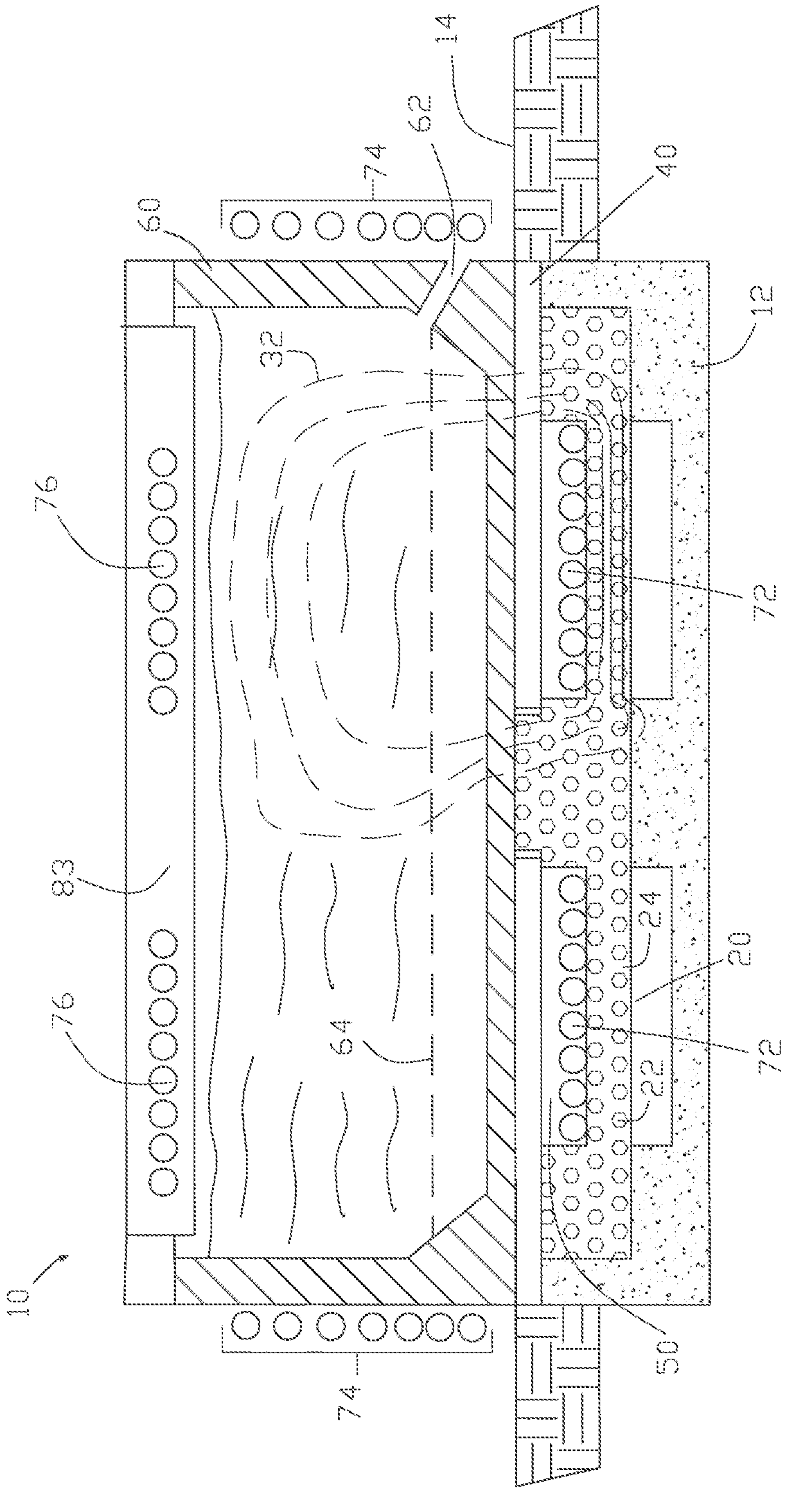
FIG. 1 is a cross sectional view of one embodiment of an apparatus of the present invention.
Figure 3B:
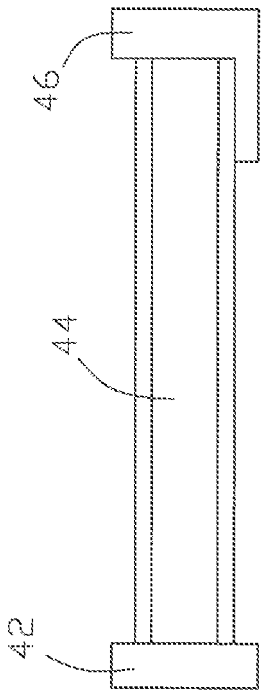
FIG. 3(*a*) is a plan view of one embodiment of a bottom support structure for use with a bottom induction apparatus 10 of the present invention.
Figure 3A:
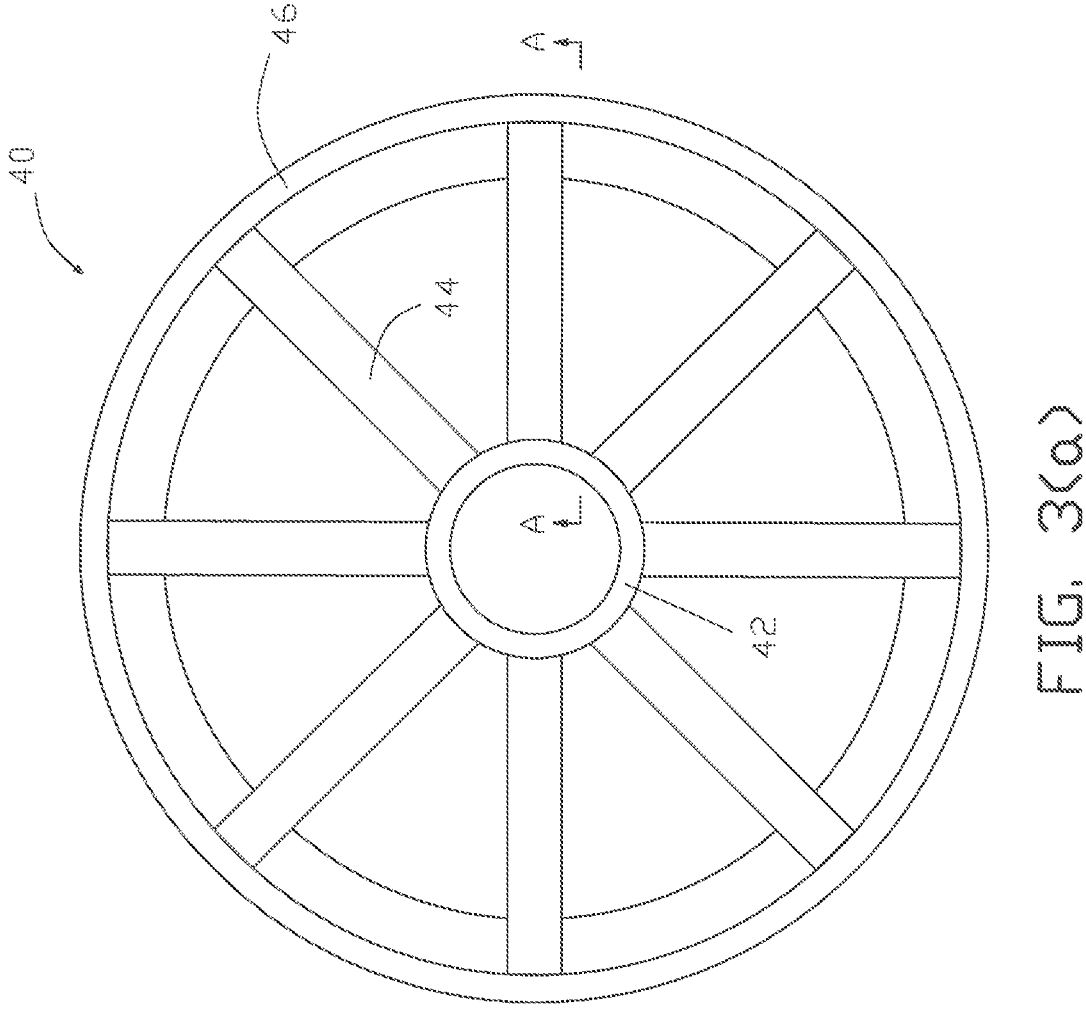

FIG. 1, FIG. 3(*a*) and FIG. 3(*b*), illustrate one example of an apparatus 10 of the present invention. While aluminum is one preferred electrically conductive ferrous or non-ferrous material for induction temperature boost or induction flow rate boost stirring in apparatus 10, the choice of ferrous or non-ferrous material does not limit the scope of the invention. Further the term "aluminum" as used herein, applies to pure aluminum and aluminum alloys without limitation to composition.

In FIG. 1 furnace foundation 12 can be provided below grade 14, and may be formed from any suitable load bearing material such as concrete.

Conductive or non-conductive crucible 60 is formed from a suitable material, such as a refractory material, with conductive or non-conductive properties. The conductive or non-conductive crucible can be provided with a plugged or valved outlet 62 that normally opens into the interior of the conductive or non-conductive crucible above a heel line 64 (indicated by a dashed line in FIG. 1). Molten aluminum below the heel line (referred to as remnant melt) is left in the conductive or non-conductive crucible while melt above the heel line is tapped through outlet 62 to provide a minimum inductively coupled load for a magnetic field generated by current flowing through bottom induction coil 72, side induction coil 74 and top induction coil 76 in selective combinations of one, two or three types of bottom, top and side induction coils. At least one suitable AC power supply (not shown in the figures) is connected to the energized coils to provide the current selectively to one, two or three of the bottom, top or side induction coils.

Depending upon the application of apparatus 10 one or more induction coils are selected from a group of a bottom induction coil, a top induction coil and a side induction coil.

Depending upon a particular application, multiple top, bottom or side induction coils are provided.

Bottom Induction Coil

In applications where a bottom induction coil is selected, bottom magnetic flux concentrator 20 is disposed on foundation 12.

In this non-limiting example of the invention, the bottom flux concentrator 14 is in the shape of a ring with a raised central section and raised outer section that form between them a space within which bottom induction coil 72 is coiled. Preferably, but not necessarily, bottom magnetic flux concentrator 20 is formed from a plurality of discrete ferromagnetic elements 22, such as steel pellets, disposed in a non-electrically conductive matrix material 24, such as a composite epoxy material. In this embodiment of the invention, bottom flux concentrator 20 can be manufactured and used in cast form.

As shown in FIG. 1, bottom induction coil 72 is disposed below the bottom of the furnace's conductive or non-conductive crucible 60 and on top of bottom magnetic flux concentrator 20. Although other forms of other bottom induction coils are used in other embodiments of the invention, in apparatus 10 shown in FIG. 1 bottom induction coil 72 is generally formed by a spirally wound inductor coil that forms a "pancake" configuration with the inductor coil lying substantially in the same horizontal plane. Bottom induction coil 72 may optionally be embedded in an electrically non-conductive material, such as an epoxy composition, or disposed within plenum 50 as shown in FIG. 1. Conductive or non-conductive crucible 60 is supported on bottom coil support structure 40. In this example of the invention, as shown in FIG. 3(*a*) and FIG. 3(*b*), bottom coil support structure 40 comprises an inner central ring element 42, a plurality of transverse support elements 44 and an outer perimeter ring element 46. Transverse support elements 44, which may be structural steel I-beams, are connected at one end to inner central ring element 42, and at the opposing end to outer perimeter ring element 46. If the transverse support elements 44 are composed of structural steel or other electrically conductive material, the width of each element 44 must be minimized so that they do not create a significant low reluctance path for the magnetic field created by an AC current flow through bottom induction coil 72. Further, if elements 44 are ferromagnetic, they must be connected to outer perimeter ring element 46 via a non-electrically conductive element, such as an electrical isolating pad in a bolted connection between element 44 and element 46, to prevent the formation of a significant low reluctance path among transverse support elements 44 and the outer perimeter ring element. The remaining volume of the disc-shaped bottom support structure 40 may be filled with a non-electrically conductive material, for example, by casting assembled elements 42, 44 and 46 in a concrete composition to provide a stronger support base for conductive or non-conductive crucible 60. The configuration of bottom coil support structure 40 in this example may be of other shapes and configurations as long as the structure provides structural support for the conductive or non-conductive crucible and allows sufficient passage of the magnetic field generated by bottom induction coil 72 for magnetic coupling with the ferrous or non-ferrous melt contained in the conductive or non-conductive crucible.

Representative magnetic flux lines 32 (shown in dashed lines in FIG. 1) illustrate (in cross section) for the right side of apparatus 10 the magnetic field that is created when AC current is supplied to bottom induction coil 72 from a suitable power supply. The eddy current induced in the molten ferrous or non-ferrous material in the conductive or non-conductive crucible 60 produces electromagnetic forces that will effectively boost stirring of the molten material without the need for stirring apparatus to increase the flow rate of the material in the conductive or non-conductive crucible. Further the frequency of the AC current supplied to the bottom induction coil may be varied to enhance the electromagnetic flow rate effect, if desired.

Bottom induction coil 72 may be formed from either hollow fluid-cooled conductors, or preferably, air-cooled conductors. For air-cooled conductors, Litz wire may be used. In other applications, bottom induction coil 72 may be of other shapes, such as rectangular in cross section, and may be formed, for example, from a flexible solid conductor, such as copper.

Bottom induction coil 72 can be composed of one or more separate coil sections that are connected to one or more suitable power supplies. Bottom induction coil 72 may also be composed of two or more separate coil sections wherein one or more of the coil sections are connected to a suitable power supply (active coils) and the remaining coils are passive coils connected to a capacitive element to form a resonant inductive/capacitive (L-C) circuit. Magnetic fields generated by current flow in the one or more active coils will induce secondary current flow in the one or more passive coils. Magnetic fields generated by current flows in the active and passive coil sections are directed towards the melt contained in the conductive or non-conductive crucible and magnetically couple with the melt to inductively heat it.

Figure 4A:
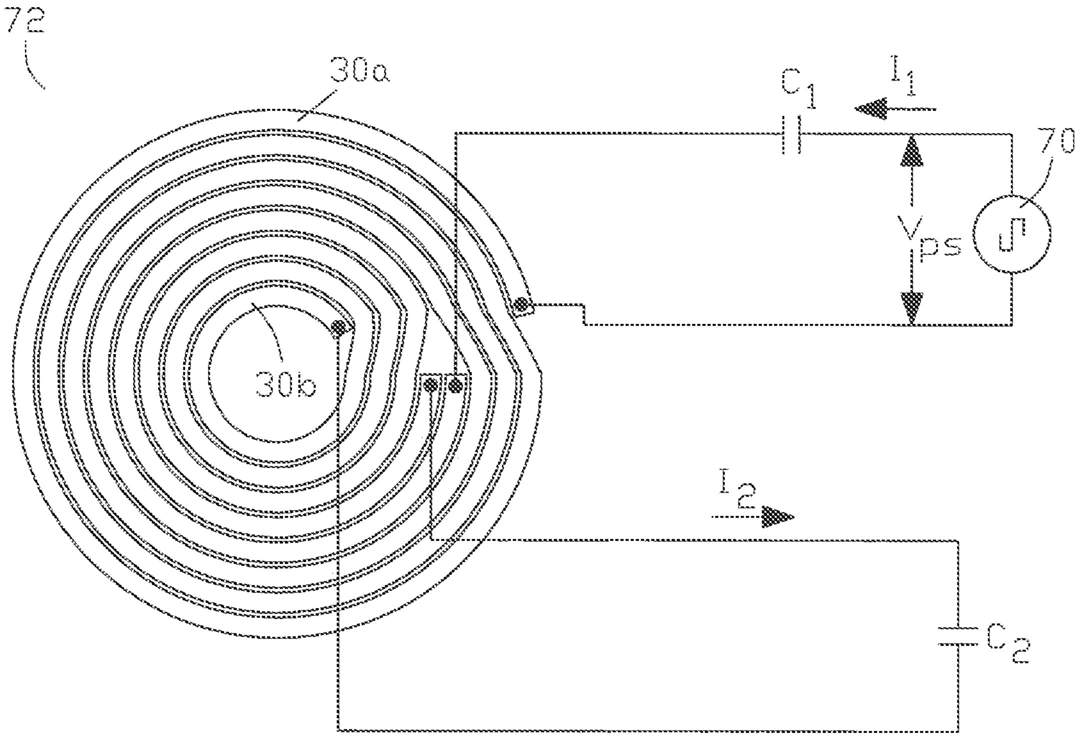
FIG. 4(*a*) is a diagram of one arrangement of a bottom, top or side induction coil used with an apparatus of the present invention wherein the at least one bottom, top or side induction coil comprises an active coil section and a passive coil section.
Figure 4B:
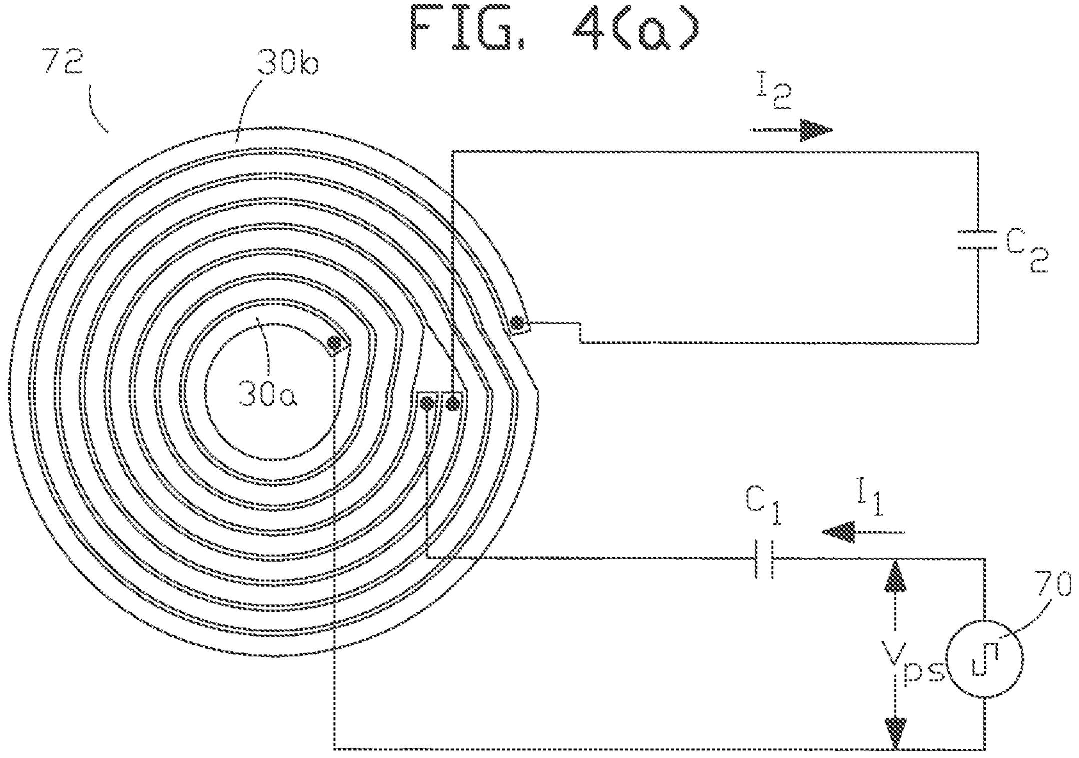
Figure 6A:
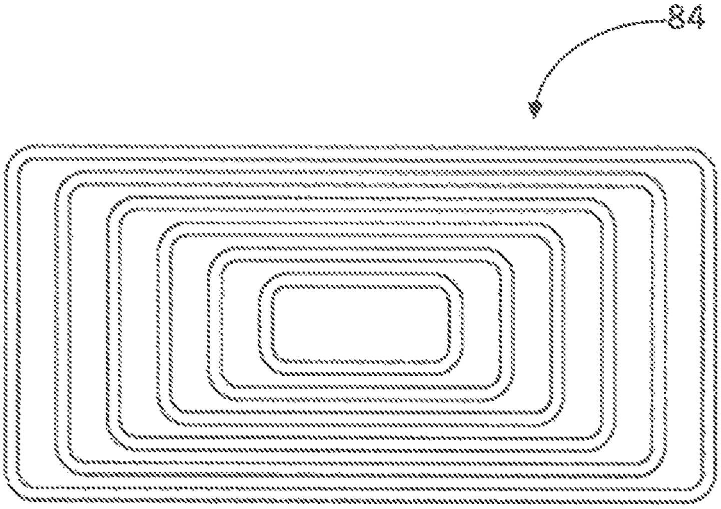
Figure 6B:
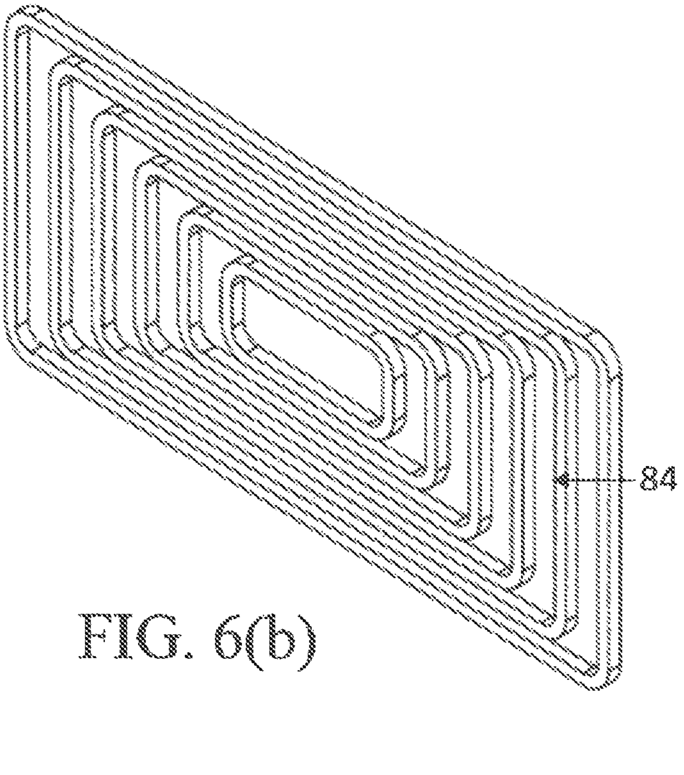
Figure 6C:
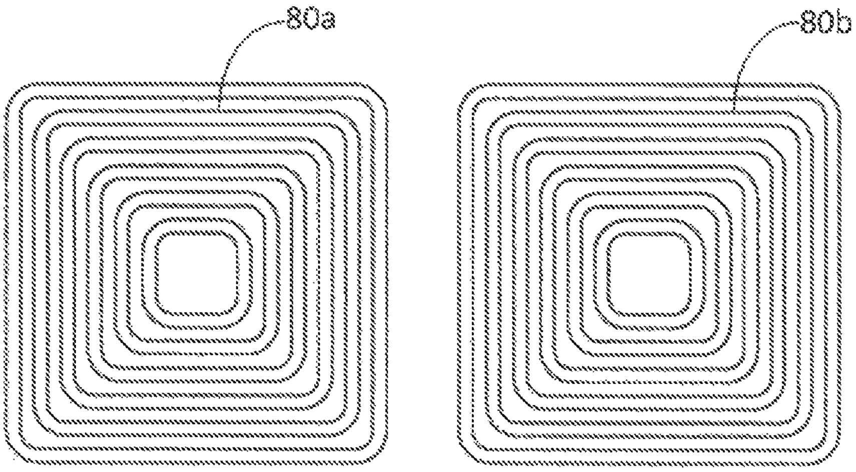
Figure 6D:
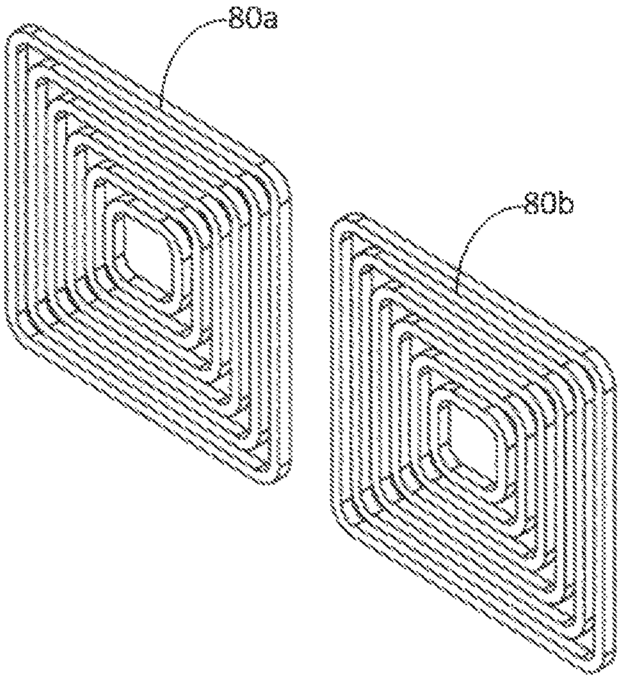

FIG. 4(*a*) and FIG. 4(*b*) illustrate examples of a bottom induction coil 72 with active coil section 30*a* and passive coil section 30*b*. AC current, $I_1$, provided from power supply 70 to coil section 30*a* through load matching capacitor $C_1$ creates a magnetic field that induces a current, $I_2$, in coil section 30*b*, which is series connected with resonant capacitor $C_2$ to form an L-C resonant circuit.

In FIG. 5(*a*) and FIG. 5(*b*) active coil section 30*a* and passive coil section 30*b* are planarly interspaced with each other, rather than being disposed planarly interior and exterior to each other as shown in FIG. 4(*a*) and FIG. 4(*b*). In other examples of the invention, the active and passive coil sections may be disposed in other arrangements such as overlapped active and passive coil sections.

In FIG. 1, plenum 50, which is bounded by flux concentrator 20 and bottom coil support structure 40, provides a gaseous (typically, but not limited to air) flow cavity through which cooling air can be provided by a forced air mechanical system (not illustrated in the drawings) to remove heat generated in bottom induction coil 72.

Side Induction Coil

Side induction coil 74 is positioned externally at least partially around the height of the conductive or non-conductive crucible 60 as illustrated in FIG. 1. Although non-limiting in form, side induction coil 74 may be helical in shape for selective side boost temperature and flow rate control of the molten ferrous or non-ferrous material in the conductive or non-conductive crucible. Structural support is provided for the side induction coil 74. The side induction coil can be otherwise shaped as required for a particular application, including but not limited to being helical in shape around the side of the conductive or non-conductive crucible or other shapes including "pancake" shaped as shown in FIG. 4(*a*) to FIG. 5(*b*). Side magnetic flux concentrators are provided to direct the magnetic field generated by the flow of AC current in side induction coil 74 towards the interior side regions of the conductive or non-conductive crucible 60.

Top Induction Coil 76

Top induction coil 76 is positioned over the top surface of the ferrous or non-ferrous material in the conductive or non-conductive crucible 60.

In the embodiment of the invention shown in FIG. 1, top induction coil 76 is embedded in refractory of removeable lid 83. Top magnetic flux concentrators are provided to direct the magnetic field generated by the flow of AC current in top induction coil 76 towards the interior surface region and below of the ferrous or non-ferrous material in the conductive or non-conductive crucible 60.

Figure 2:
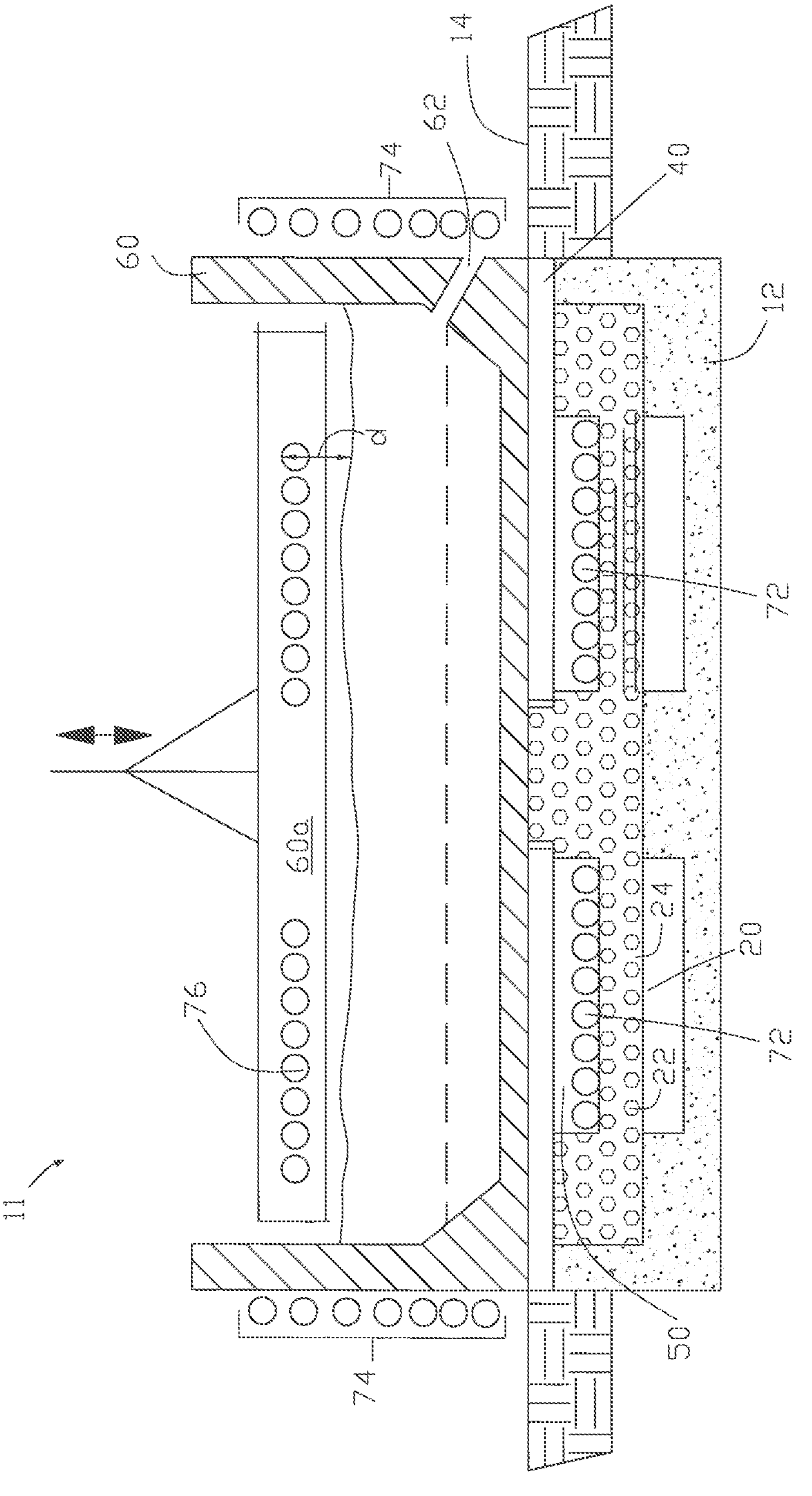
FIG. 2 is a cross sectional view of another embodiment of an apparatus of the present invention.

In an alternate embodiment of the invention shown in FIG. 2 apparatus 11 has top induction coil 76 embedded in refractory on moveable conductive or non-conductive crucible top 60*a* which allows altering the vertical height of the top induction coil 76 as the melt is poured from conductive or non-conductive crucible 60 to minimize the vertical distance ("d" in FIG. 2) between top induction coil 76 and the surface of the material in the conductive or non-conductive crucible.

FIG. (6*a*) and FIG. 6(*b*) are respectively alternative planar and perspective views of one non-limiting example of a flat rectangular array induction coil 84 suitable for use as a bottom, top or side induction coil in the present invention with connection to one or more suitable power supplies not shown in the figures.

FIG. 6(*c*) and FIG. 6(*d*) are respectively alternative planar and perspective views of one non-limiting sample of a pair of flat square array induction coils 80*a* and 80*b* suitable for use as a bottom, top or side induction coil in the present invention with connection to one or more power supplied not shown in the figures.

The foregoing embodiments do not limit the scope of the disclosed invention. The scope of the disclosed invention is further covered in the appended claims.

The invention claimed is:

1. An apparatus for a temperature or flow rate of an electrically conductive ferrous or non-ferrous material in an induction furnace, the apparatus comprising:

a conductive or non-conductive crucible to contain the electrically conductive ferrous or non-ferrous material;

a bottom support structure to support a bottom of the conductive or non-conductive crucible;

a bottom magnetic flux concentrator disposed below the bottom support structure;

an at least one bottom induction coil disposed between the bottom support structure and the bottom magnetic flux concentrator;

at least one side induction coil disposed exteriorly at least partially along a height of the conductive or non-conductive crucible;

wherein the at least one side induction coil comprises a spirally wound inductor coil lying in a same horizontal plane defining a pancake configuration; and at least one top induction coil disposed over a top surface of the electrically conductive ferrous or non-ferrous material in the conductive or non-conductive crucible whereby a magnetic field generated by a flow of an AC current through the at least one bottom, side and top induction coils penetrate the electrically conductive ferrous or non-ferrous material in the conductive or non-conductive crucible to induce an eddy current in the electrically conductive ferrous or non-ferrous material that boost the temperature or flow rate of the electrically conductive ferrous or non-ferrous material in the conductive or non-conductive crucible.

2. The apparatus of claim 1 wherein the electrically conductive ferrous or non-ferrous material has a thermal conductivity value less than or equal to the thermal conductivity of aluminum or an aluminum alloy.

3. The apparatus of claim 1 wherein the at least one bottom, side and top induction coils comprises:

an at least one active induction coil section, each of the at least one active induction coil section connected to an AC power supply; and an at least one passive induction coil section connected to a capacitor to form a resonant circuit, whereby the magnetic field generated in the at least one active induction coil section magnetically couples with the at least one passive induction coil section to induce a secondary current flow through the at least one passive induction section to generate a secondary magnetic field that penetrates the electrically conductive ferrous or non-ferrous material to induce the eddy current in the electrically conductive ferrous or non-ferrous material that heats the electrically conductive ferrous or non-ferrous material.

4. The apparatus of claim 3 wherein the at least one active induction coil section and the at least one passive induction coil section are disposed interior and exterior to each other.

5. The apparatus of claim 3 wherein the at least one active induction coil section and the at least one passive induction coil section are interspaced with each other.

6. The apparatus of claim 1 further comprising a plenum formed between the magnetic bottom flux concentrator and the bottom support structure for the flow of a cooling medium to cool the at least one bottom and the at least one side induction coil.

7. The apparatus of claim 1 wherein the conductive or non-conductive crucible forms a geometric volume for containing the electrically conductive ferrous or non-ferrous material, the geometric volume having a diameter to height ratio in the range of 3:1 to 6:1.

8. An apparatus for boosting a temperature or flow rate of an electrically conductive ferrous or non-ferrous material, comprising:

either a conductive or non-conductive crucible to contain the electrically conductive ferrous or non-ferrous material;

a bottom support structure to support the bottom of the conductive or non-conductive crucible, the bottom support structure having passages therein for the transmission of an electromagnetic field;

a magnetic flux concentrator disposed below the bottom support structure; and an at least one bottom induction coil disposed between the bottom support structure and the magnetic flux concentrator;

at least one side induction coil disposed exteriorly at least partially along a height of the conductive or non-conductive crucible;

wherein the at least one side induction coil comprises a spirally wound inductor coil lying in a same horizontal plane defining a pancake configuration; and at least one top induction coil disposed over a top surface of the electrically conductive ferrous or non-ferrous material in the conductive or non-conductive crucible;

the at least one bottom, side and top induction coils each formed from an at least one active coil section and an at least one passive coil section whereby a magnetic field generated by a flow of AC current through the at least one bottom, side and top induction coils penetrate the electrically conductive ferrous or non-ferrous material in the conductive or non-conductive crucible to induce an eddy current in the electrically conductive ferrous or non-ferrous material to boost the temperature or to boost the flow rate of the electrically conductive ferrous or non-ferrous material in the conductive or non-conductive crucible.

9. The apparatus of claim 8 wherein the electrically conductive ferrous or non-ferrous material has a thermal conductivity value less than or equal to the thermal conductivity of aluminum or an aluminum alloy.

10. The apparatus of claim 1, wherein the at least one side induction coil comprises a flat rectangular array induction coil.

11. The apparatus of claim 1, wherein the at least one side induction coil comprises a flat square array induction coil.

12. The apparatus of claim 1, further comprising one or more side magnetic flux concentrators proximate to the at least one side induction coil, such that the at least one side induction coil is disposed between the one or more side magnetic flux concentrators and a side support structure disposed on an exterior of the conductive or non-conductive crucible, the one or more side magnetic flux concentrators positioned to direct the magnetic field generated by the at least one side induction coil laterally inwards towards the electrically conductive ferrous or non-ferrous material disposed within the conductive or non-conductive crucible.

13. The apparatus of claim 1, wherein the flow of the AC current is provided to a selective combination of the at least one bottom induction coil, the at least one side induction coil, and the at least one top induction coil to generate the magnetic field.

14. A method of boosting a temperature or flow rate of an electrically conductive ferrous or non-ferrous material in a conductive or non-conductive crucible comprising the steps:

supporting the conductive or non-conductive crucible on a bottom support structure;

placing the electrically conductive ferrous or non-ferrous material in the conductive or non-conductive crucible;

generating a plurality of magnetic fields from a flow of an AC current through an at least one bottom induction coil disposed below the bottom support structure; an at least one side induction coil; and an at least one top induction coil;

wherein the at least one side induction coil comprises a spirally wound inductor coil lying in a same horizontal plane defining a pancake configuration;

directing the plurality of magnetic fields towards the bottom, side and top surface of the electrically conductive ferrous or non-ferrous material in the conductive or non-conductive crucible; and magnetically coupling the magnetic field with the electrically conductive ferrous or non-ferrous material in the conductive or non-conductive crucible to boost the temperature or to boost the flow rate of the electrically conductive ferrous or non-ferrous material in the conductive or non-conductive crucible.

15. The method of claim 14 wherein the electrically conductive ferrous or non-ferrous material has a thermal conductivity value less than or equal to the thermal conductivity of aluminum or an aluminum alloy.

16. The method of claim 14 wherein the step of directing the magnetic field towards the bottom of the conductive or non-conductive crucible includes placing a magnetic flux concentrator below the at least one bottom induction coil.

17. The method of claim 14 wherein the frequency of the AC current is adjusted to control the flow rate of the electrically conductive ferrous or non-ferrous material in the conductive or non-conductive crucible.

18. The method of claim 17 further comprising the steps of:

inducing an AC secondary current in an at least one passive coil section of the at least one bottom, side and top induction coils by magnetically coupling the at least one passive coil section to an at least one active coil section of the at least one bottom, side and top induction coil, the at least one active coil section connected to a source of AC current, the secondary AC current generating a secondary magnetic field exterior to the at least one passive coil section; and magnetically coupling the secondary magnetic field with the electrically conductive ferrous or non-ferrous material in the conductive or non-conductive crucible to boost the temperature or to boost the flow rate of the electrically conductive ferrous or non-ferrous material in the conductive or non-conductive crucible.

19. The method of claim 14 selectively energizing any combination of the at least one bottom induction coil, side induction coil and top induction coil to boost the temperature or to boost the flow rate of the electrically conductive ferrous or non-ferrous material in the conductive or non-conductive crucible.

20. The method of claim 14, wherein the flow of the AC current is provided to a selective combination of the at least one bottom induction coil, the at least one side induction coil, and the at least one top induction coil to generate the magnetic field.

* * * * *